(12) United States Patent
Inukai et al.

(10) Patent No.: US 7,773,576 B2
(45) Date of Patent: Aug. 10, 2010

(54) SLOTTED ALOHA CONGESTION CONTROL

(75) Inventors: Tom Inukai, Gaithersburg, MD (US); Karim Zamani, Germantown, MD (US); Moorthy Hariharan, Rockville, MD (US)

(73) Assignee: ViaSat, Inc., Carlsbad, CA (US)

( * ) Notice: Subject to any disclaimer, the term of this patent is extended or adjusted under 35 U.S.C. 154(b) by 213 days.

(21) Appl. No.: 12/037,760

(22) Filed: Feb. 26, 2008

(65) Prior Publication Data

US 2008/0205276 A1 Aug. 28, 2008

Related U.S. Application Data

(60) Provisional application No. 60/891,820, filed on Feb. 27, 2007.

(51) Int. Cl.
*H04J 3/26* (2006.01)
(52) U.S. Cl. .................................. 370/347; 370/349
(58) Field of Classification Search .................. 370/345, 370/347, 349
See application file for complete search history.

(56) References Cited

FOREIGN PATENT DOCUMENTS

| WO | WO 2005/060188 A | 6/2005 |
|---|---|---|
| WO | WO 2006/096022 A | 9/2006 |

OTHER PUBLICATIONS

United States Patent and Trademark Office International Search Report and Written Opinion, Dec. 10, 2008, pp. 1-20, PCT/US2008/055094.
Chitre, D.M. et al., "Random Access with Notification—A New Multiple-Access Scheme for VSAT Networks," Comsat Technical Review, Communications Satellite Corporation, Washington, US, vol. 19, No. 1, Mar. 21, 1989, pp. 99-121, XP000084954.

*Primary Examiner*—Melvin Marcelo
(74) *Attorney, Agent, or Firm*—Townsend and Townsend and Crew LLP

(57) ABSTRACT

A slotted Aloha communication system is provided according to one embodiment of the invention. The system may include a hub and a plurality of RCSTs. According to one embodiment, congestion control may occur at the RCST based in part on the number of segments received at the hub, the number of retransmission segments received at the hub and the number of successful collision retransmission segments received at the hub. The hub may communicate information regarding received segments. Congestion control may include calculating a transmission probably, performing a skewed probability measure with a probability equal to the transmission probability. If the results of the probability measure is positive the RCST may transmit or retransmit a segment within a first time prior, if the probability measure is negative then the RCST waits a set time period and reperforms the skewed probability measure.

16 Claims, 14 Drawing Sheets

SLOTTED ALOHA CONGESTION CONTROL

CROSS-REFERENCE TO RELATED APPLICATIONS

This application is a non-provisional, and claims the benefit, of commonly assigned U.S. Provisional Application No. 60/891,820, filed Feb. 27, 2007, entitled "Slotted Aloha Congestion Control," the entirety of which is herein incorporated by reference for all purposes.

BACKGROUND OF THE INVENTION

Slotted Aloha systems may employ sliding window congestion control with negative or positive acknowledgment. These systems may be inefficient because the retransmission of segments or packets does not take into account the load in the network. Other systems sense whether data is being transmitted prior to sending data segments and/or packets. If data is being sent, then the system backs off and tries again after waiting a random period of time. Such systems require expensive hardware and/or software at the transmitter to sense the network load.

BRIEF SUMMARY

A method for providing congestion control in a slotted Aloha communication system is provided according to embodiments of the invention. The slotted Aloha communication system may include a hub in communication with one or more RCST. The method may include receiving segments from one or more RCST at the hub. Each segment is received from an RCST at the hub during a set timeslot. When a segment is received a transmission counter is incremented. If the segment is a retransmission segment, then the retransmission counter is incremented. The method may check to see if the retransmission flag is asserted. If the segment is an unsuccessful collision retransmission segment then the successful retransmission counter is incremented. The system may check to see if the successful retransmission flag is asserted. A message may be transmitted to each RCST after a first number of timeslots have elapsed that includes the transmission counter, the retransmission counter, and the successful retransmission counter. In another embodiment, the hub may transmit a message to each RCST after a first time interval that includes a transmission probability.

The message transmitted to each RCST may also includes information correlating segments received during the first time period with the RCST that transmitted the segments and the timeslot in which the segment was received. The transmission counter, the retransmission counter, and the successful retransmission counter may be reset to initial values after a second time interval. The first and second time intervals may be integer multiples of timeslots.

A method for providing congestion control in a slotted Aloha communication system that includes a hub in communication with one or more RCSTs is disclosed according to one embodiment of the invention. The method occurring at the hub may include receiving segments during separate timeslots from one or more RCST. For each received segment the method determines which RCST sent the segment, for example, by reading the RCST id in the segment. The method may also create a segment detection bitmap that includes information correlating received segments with the RCST that transmitted the segments and the timeslot in which the segment was received. The method may also transmit the segment detection bitmap to each RCST after a segment detection period. The segment detection bitmap may further comprise information including the number segments received during the segment detection period, the number of retransmission segments received during the segment detection period, and the number of successful collision retransmission segments received during the segment detection period.

Another method for providing congestion control in a slotted Aloha communication system that includes a hub in communication more than one RCST is provided according to another embodiment of the invention. The method occurring at an RCST may transmit a first segment to the hub during a first timeslot and receive a segment detection bitmap from the hub. The segment detection bitmap may be received after the first segment is transmitted to the hub. The method may determine from the segment detection bitmap whether the first segment was received at the hub and asserting the retransmission flag in the first segment if the first segment was not received at the hub. The method may also determine from the segment detection bitmap whether the first segment was not received at the hub due to a collision with another segment from another RCST that was successfully received, and asserting the successful collision flag in the first segment if the segment was not received due to a successful collision. The method may then retransmit the first segment if either or both of the retransmission flag is asserted or the successful collision flag is asserted.

The method may also place the first segment in a retransmission queue at the RCST after transmitting the first segment to the hub. The first segment may be removed from the retransmission queue if the first segment was received at the hub according to the segment detection bitmap. The segment detection bitmap may comprise information that identifies RCSTs that transmitted a received segment during a specific timeslot. The method may also transmit the next segment if the first segment was received at the hub. The RCST may calculate a transmission probability based on information communicated to the RCST in the segment detection bitmap or a transmission probability may be included in the segment detection bitmap. With this transmission probability the RCST may perform a binary probabilistic measure and determine a timeslot to transmit the next segment or to retransmit the first segment based on the result of the binary probabilistic measure. The binary probabilistic measure may include a skewed coin toss.

Another method for providing congestion control in a slotted Aloha communication system that includes a hub in communication with more than one RCST is also provided. The method occurring at an RCST and includes: receiving a segment detection bitmap; determining a transmission probability from information in segment detection bitmap and performing a binary probabilistic measure with the probability of success equal to the transmission probability. If the binary probabilistic measure is successful then a timeslot is selected within a number of timeslots for transmitting a segment, otherwise, if the binary probabilistic measure is unsuccessful the RCST waits a number of timeslots to re-perform the binary probabilistic measure.

In one embodiment, the present disclosure provides for a communications method between a first terminal and one or more second terminals including receiving at the first terminal a plurality of data segments from one or more second terminals, wherein the plurality of data segments are received during timeslots; and broadcasting from the first terminal to the one or more second terminals a segment detection bitmap, wherein the segment detection bitmap communicates to the one or more second terminals which of the plurality of data segments were received at the first terminal.

In another embodiment, the present disclosure provides for a method for determining a transmission probability in a network, the method including measuring the number of retransmitted segments over a period of time. In order to determine the number of retransmitted segments, a retransmitted segment will include a flag indicating that the segment is being retransmitted from the first terminal to the second terminal. The transmission probability may then be determined based on the number of retransmitted segments.

In another embodiment, the present disclosure provides for a method for congestion control in a satellite network, the method including detecting a load on the network at the network layer; and modifying the number of dedicated timeslots based on the load.

In another embodiment, the present disclosure provides for a method of controlling congestion based on a transmission probability in a network, if the transmission probability equals one the method includes sending a segment during the next timeslot. If the transmission probability is less than one, the method includes performing a skewed coin toss with probability equal to the transmission probability. If the coin toss is successful, randomly selecting a timeslot and sending a segment during the randomly selected timeslot. If the coin toss is unsuccessful, wait a period of time and perform the coin toss again.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

Figure 1A:
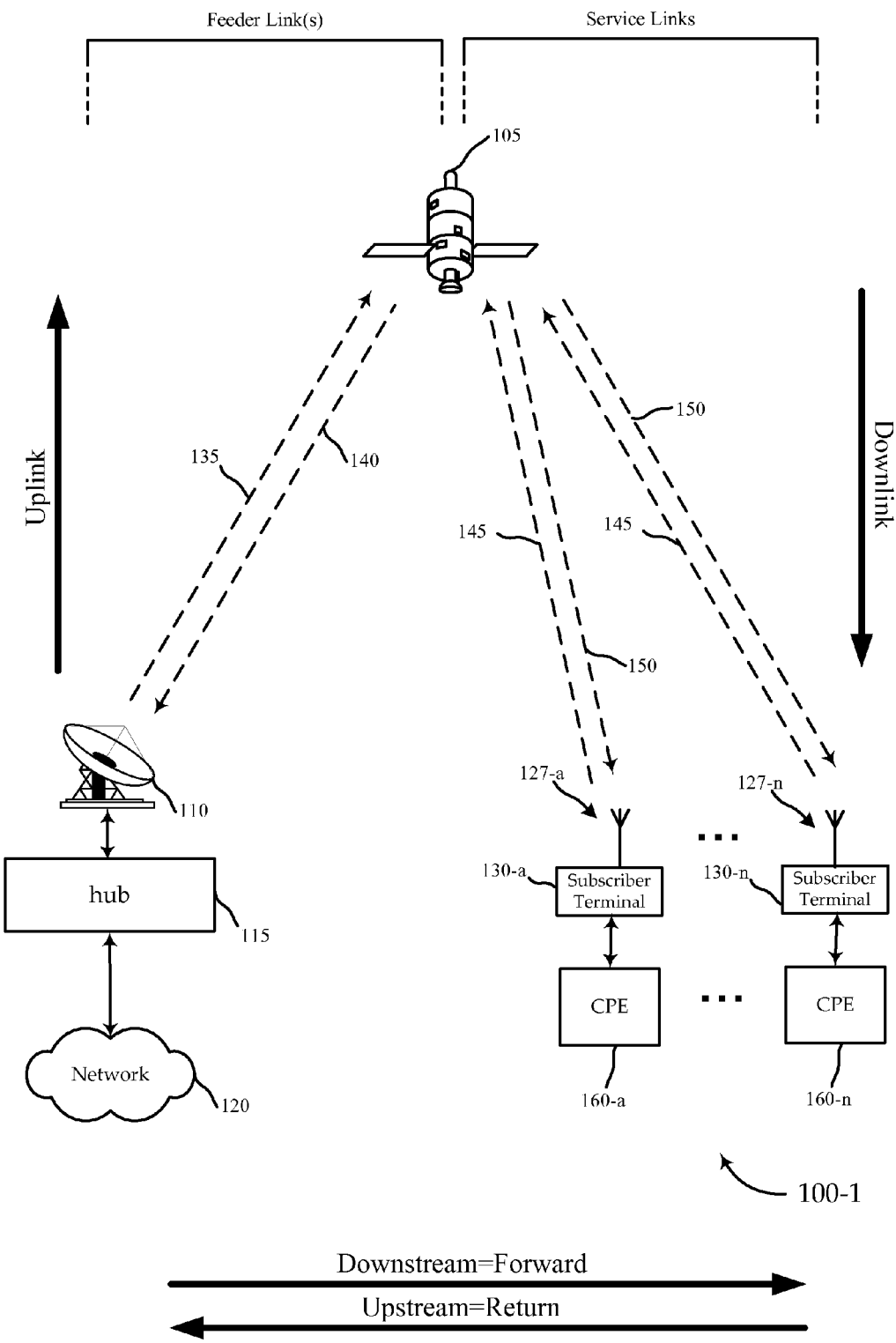
FIGS. 1A-1D show communication systems that may use a slotted aloha system according to various embodiments of the invention.

Referring initially to FIG. 1A, an embodiment of a satellite system 100-1 is shown. In this embodiment, a hub 115 is coupled with a network 120, for example, the Internet or an intranet. The hub 115 uses a satellite dish 110 to bi-directionally communicate with a satellite 105 on a feeder link. An upstream forward link 135 communicates information from the hub 115 to the satellite 105, and a downstream return link 140 communicates information from the satellite 105 to the hub 115. Although not shown, there may be a number of hubs 115 in the system 100. The satellite 105 and return channel satellite terminals (RCSTs) 130 are configured in a star or hub topology with satellite 105 as the hub or with more than one satellite and the hub as a hub.

The satellite 105 could perform switching or be a bent-pipe. Information bi-directionally passes through the satellite 105. The satellite 105 could use antennas or phased arrays when communicating. The communication could be focused into spot beams or more broadly, for example, the continental US (CONUS). Satellites 105 have trouble reaching RCSTs 130 through foliage or other obstructions. At certain frequencies, even weather and other atmospheric disturbances can cause a satellite signal to fade.

The RCSTs 130 in this embodiment are bi-directionally coupled to the satellite 105 to provide connectivity with the network 120. Each RCST 130 receives information with a shared forward downlink 150 from the satellite 105, and transmit information is sent on a shared forward uplink 145. Each RCST 130 can send information upstream to the satellite 105 using TDM.

Shown in this embodiment are RCSTs 130 with a single antenna 127. RCSTs 130 with multiple antennas may also be used in a MIMO, SIMO or MISO configuration. The RCST 130 can be in a fixed location or can be mobile. In this embodiment, the RCST 130 interacts with a single transceiver in the satellite 105. Other embodiments could allow the RCST 130 interact with multiple transceivers that maybe oribitally located or non-orbitable (e.g., air, ground or sea based). Some embodiments of the RCST 130 allow switching between these modes.

Figure 1B:
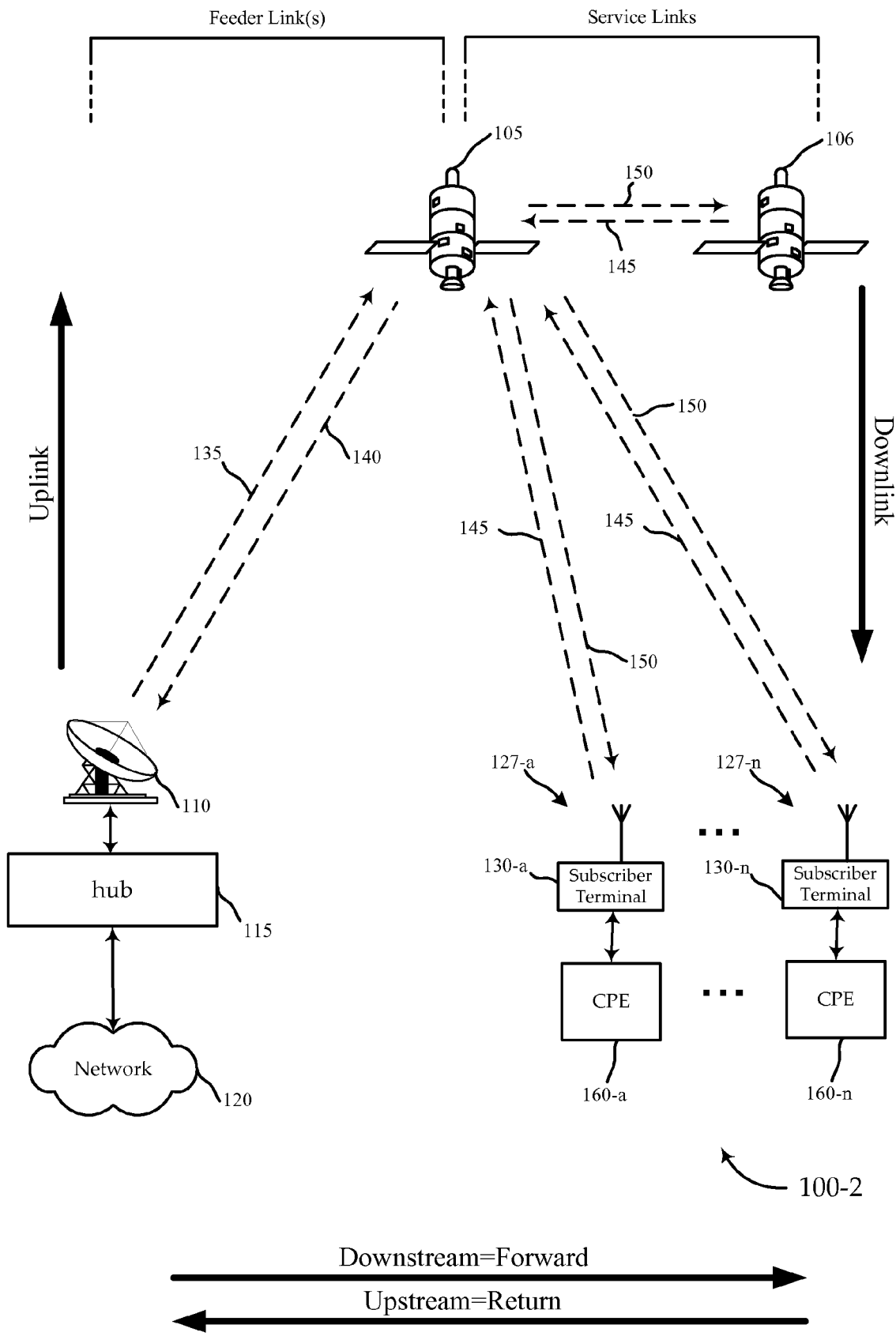

Referring next to FIG. 1B, another embodiment of a satellite system 100-2 is shown. This embodiment has a single satellite 105 at the center of a hub or star communications arrangement with RCSTs 130 and a satellite 106 communicating with hub satellite 105. Multiple satellites may be used.

Figure 1C:
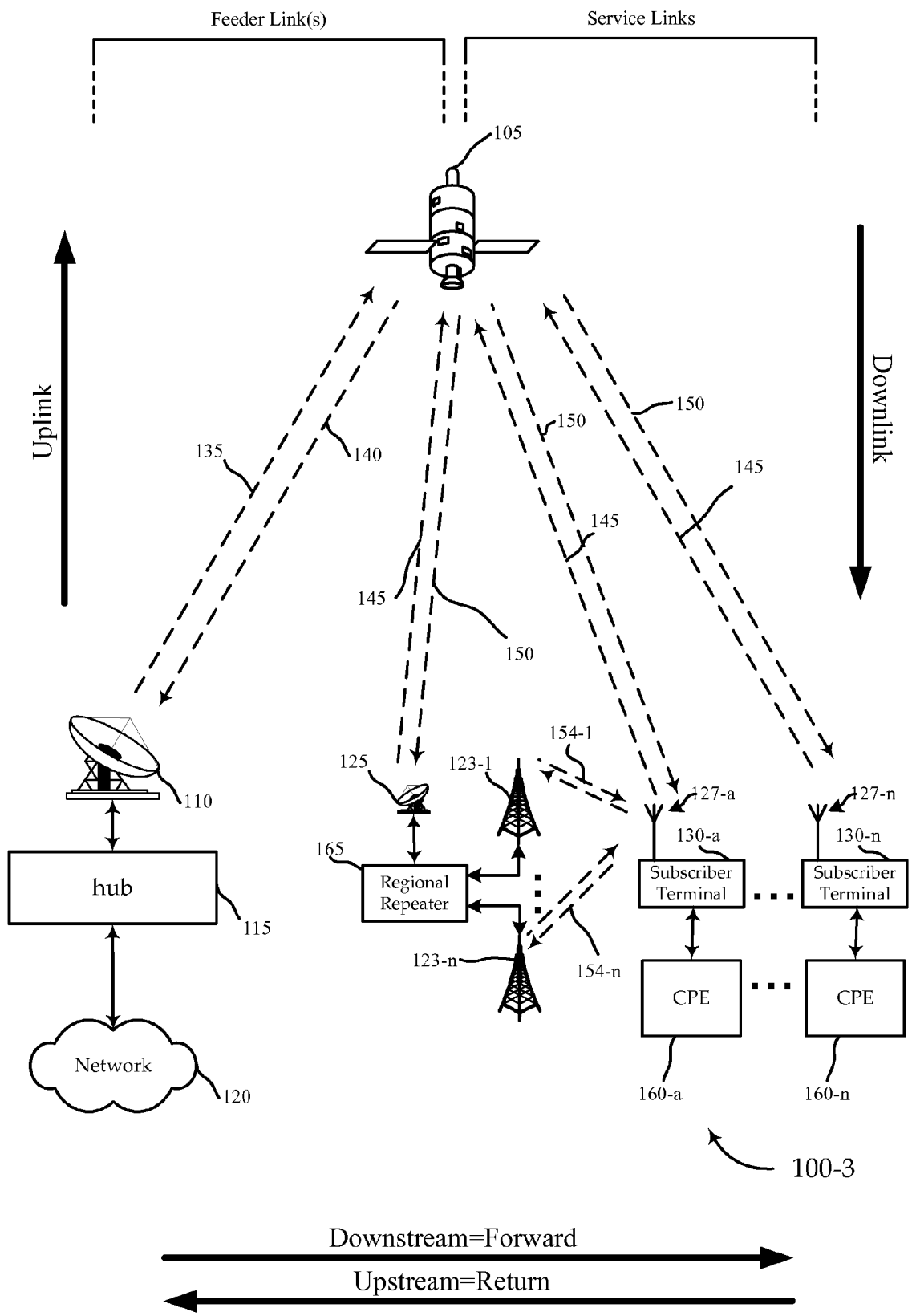

With reference to FIG. 1C, yet another embodiment of the satellite system 100-3 is shown. This embodiment includes a number of regional repeaters 165 in the hub or star networking configuration. The regional repeaters 165 may terrestrially distributed to allow enhanced coverage. At any given moment, a subscriber may be able to communicate with regional repeaters 165 and/or the satellites 105. A service link between the regional repeater antenna 125 and the satellite 105 allow relaying activity on a terrestrial link(s) 154.

The RCST 130 achieves connection to the Hub through the regional repeaters 123 and the satellite 105. The regional repeater 165 can be located anywhere sub-orbital (e.g., a balloon, an aircraft, ground-based, on buildings, ship-mounted, etc.). This embodiment shows the regional repeater having a multiple terrestrial antenna 123, but other embodiments could have a single terrestrial antenna 123 for each regional repeater 165. Even though this embodiment only shows a single satellite 105, other embodiments could have multiple satellites 105.

Figure 1D:
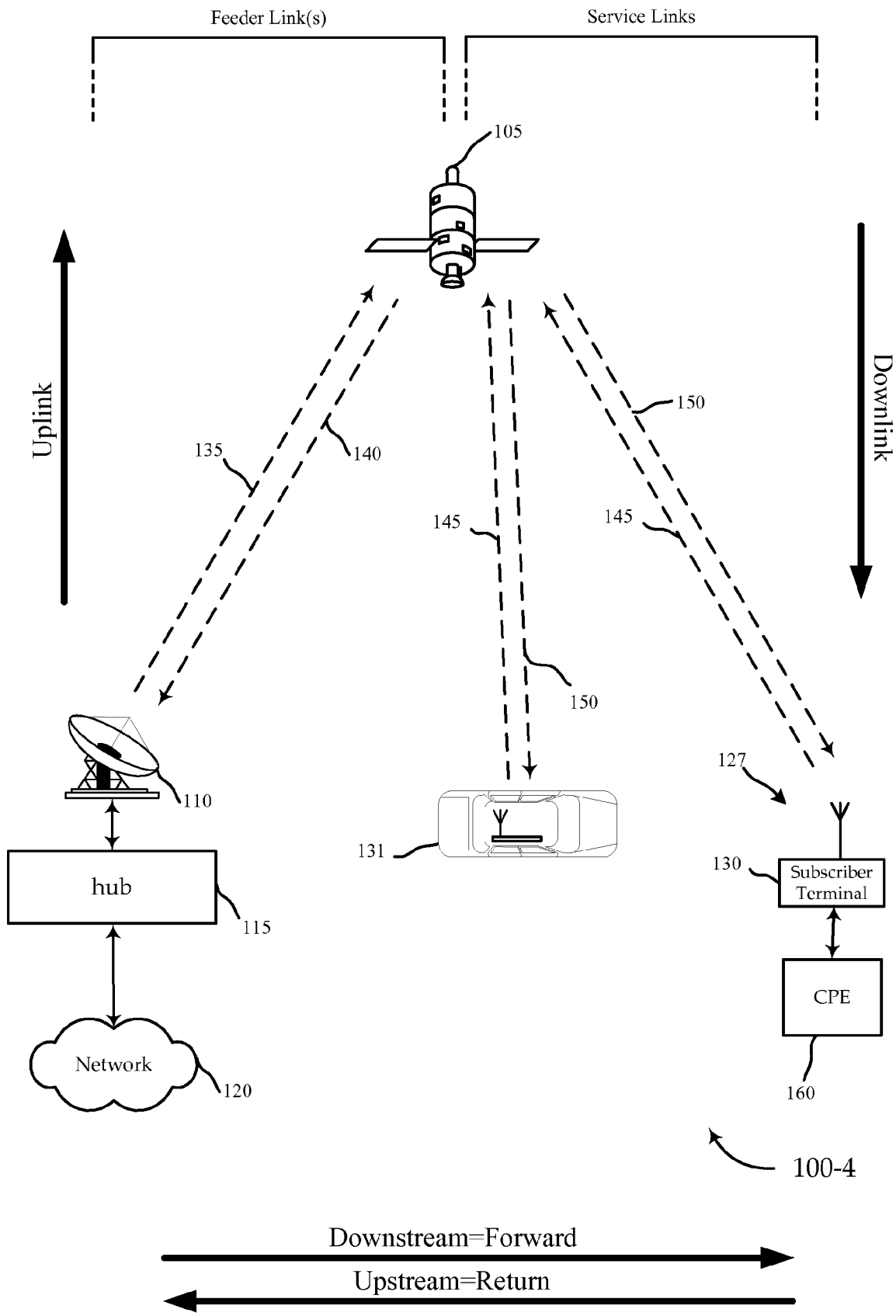

Referring to FIG. 1D, still another embodiment of the satellite system 100-4 is shown with a mobile RCST. The forward uplink from the hub to the RCSTs may be a continuous link. The hub may broadcast to each and every RCST in the network. The downlink from the RCSTs to the hub may use time division multiplex access (TDM) techniques. In the TDM techniques, timeslots may be randomly or dynamically assigned.

Figure 2:
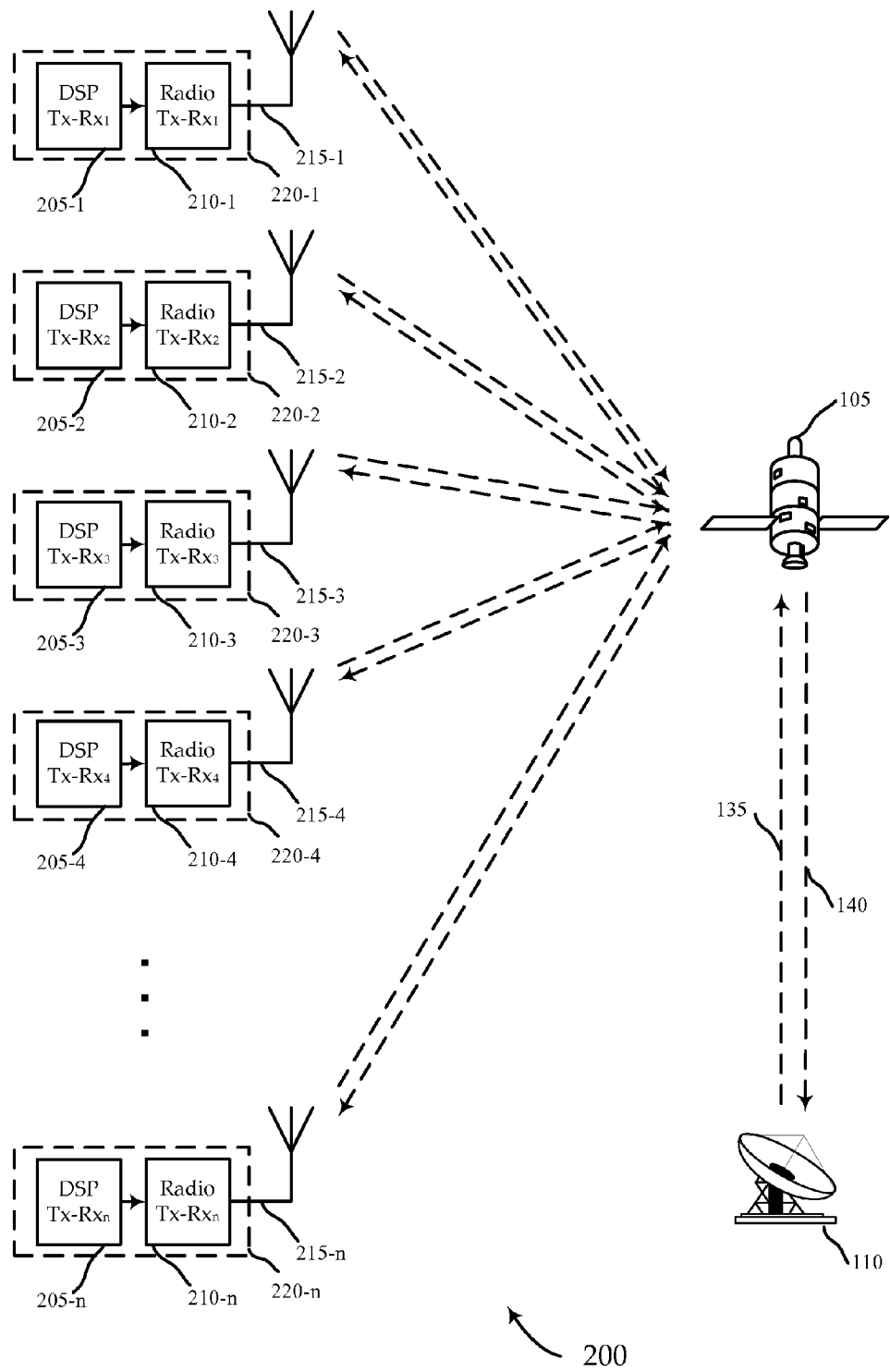
FIG. 2 shows another communication system that may use a slotted aloha system according another embodiment of the invention.

Turning to FIG. 2, a system is shown illustrating a communication scheme that may be leveraged in the system 100 as set forth in FIG. 1. The scheme shows a set of RCSTs 220 and a satellite 105 which is contact with a hub 110. Each RCST 220 is coupled to an antenna 215 and may include digital signal processing modules 205 and a transmitter and receiver radio 210.

Figure 3:
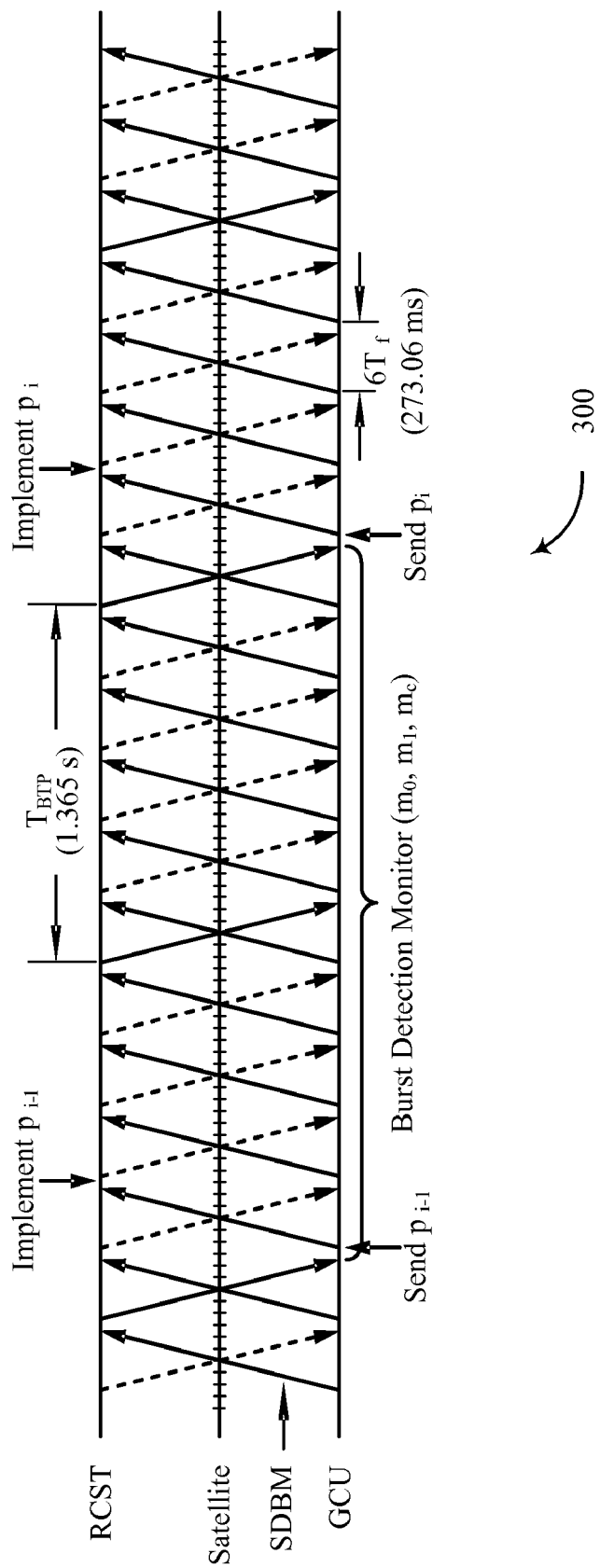
FIG. 3 shows a timing diagram that includes segment timing and SDBM transmission timing according to embodiments of the invention.

FIG. 3 shows a timing diagram 300 of congestion control according to one embodiment of the invention. The RCST is in communication with a hub control unit (GCU) through a satellite. The GCU sends a segment detection bitmap (SDBM) to the RCSTs every time period as shown by the solid black arrows from the GCU to the RCST. A packet may be sent within a single time slots or over multiple time slots as segments. A segment may be a packet or a partial packet. Multiple packets may be sent within one time slot. User data may be sent in a timeslot as shown by the dashed arrows from the RCST to the GCU. In this embodiment, one congestion control cycle starts when the GCU sends $p_{i-1}$ and lasts for a total of 12 cycles. During this congestion control cycle, the GCU monitors $m_o$, $m_f$, and $m_c$ and accumulates these values throughout the cycle. During each cycle the system uses the previously calculated transmission probability $p_i$. The RCST implements the new transmission probability upon receipt. Some lag between transmission and reception of the transmission probability.

Figure 4:
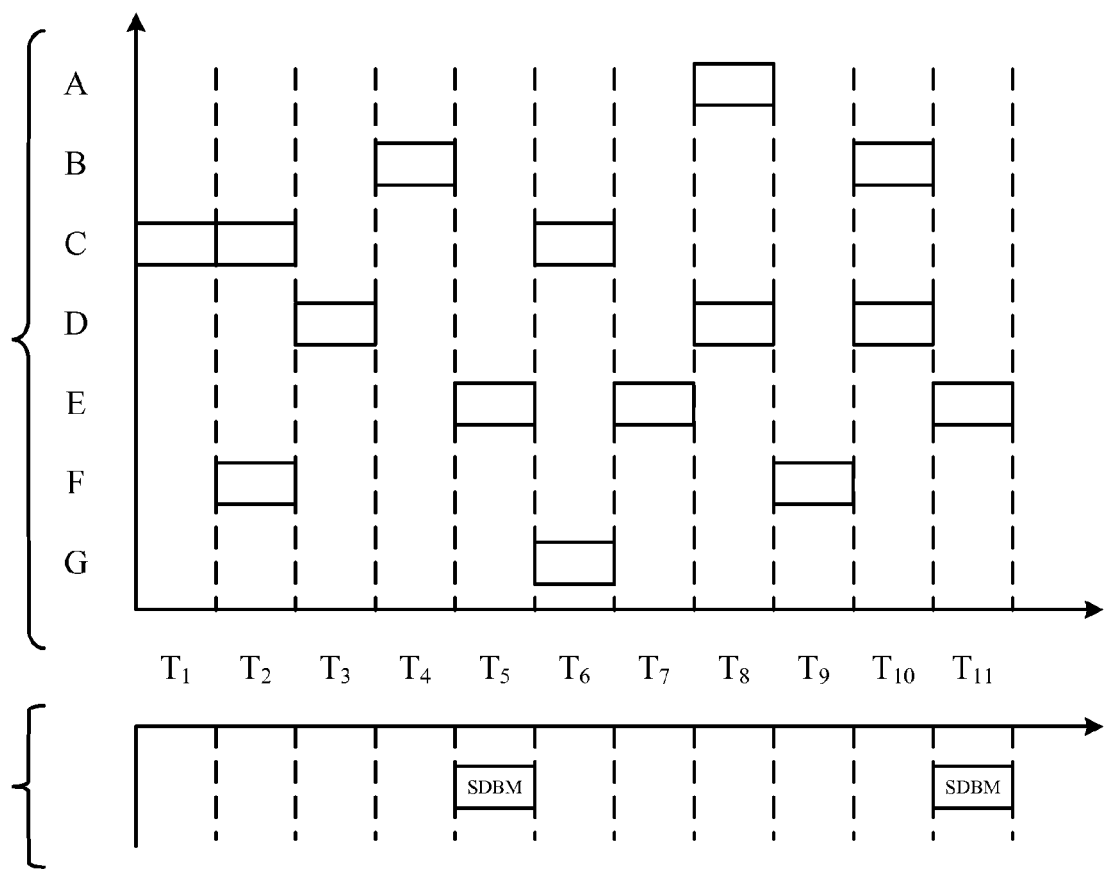
FIG. 4 shows a diagram of seven RCSTs transmitting segments over a slotted aloha network according to one embodiment of the invention.

FIG. 4 shows a segment timing diagram according to one embodiment of the invention. Seven RCSTs (designated as A, B, C, D, E, F, G in the diagram) communicate with a hub over the same channel. The RCSTs send data segments at specific timeslots ($T_1$ through $T_{11}$ in the figure) as specified by a burst time plan (BTP). Each RCST may send a segment at any timeslot. In this embodiment, at timeslot $T_1$ RCST C sends a data segment. At timeslot $T_2$ RCSTs C and F send data segments, which result in a data collision. At timeslot $T_3$ RCST D sends a data segment. At timeslot $T_4$ RCST B sends a data segment. At timeslot $T_5$ RCST E sends a data segment. At timeslot $T_6$ RCSTs C and G send data segments resulting in a collision. At timeslot $T_7$ RCST E sends a data segment. At timeslot $T_8$ RCSTs A and D send data segments that result in a collision. At timeslot $T_9$ RCST F sends a data segment. At timeslot $T_{10}$ RCSTs B and D send data segments resulting in a collision. At timeslot $T_{11}$ RCST E sends a data segment.

At timeslot $T_5$ and $T_1$ the hub broadcasts a SDBM back to each of the RCSTs. The SDBM includes information specifying to the RCSTs which data segments were received from the RCSTs. In one embodiment the SDBM specifies the timeslot in which data segments were received. In another embodiment the SDBM specifies the RCST that sent the data segment. In yet another embodiment, the SDBM may send a portion of the data segment or a check sum. In the embodiment shown in FIG. 4, the SDBM is sent every six timeslots. In other embodiments, the SDBM is sent after more than one time segments.

The SDBM sent at timeslot $T_5$ may indicate that the hub received a data segment from RCST C at $T_1$, a data segment from RCST D at timeslot $T_3$, and a data segment from RCST B at timeslot $T_4$. The collision of segments at timeslot $T_2$ may not be reported in the SDBM because the two segments collided. RCST C and F, upon receipt of the SDBM at timeslot $T_5$ would recognize that those segments were not received at the hub. Accordingly, RCST C and F may then wait a random period of time and then resend the segments originally sent in timeslot $T_2$. The system may retransmit the segment according to the algorithms discussed below. In this example, RCST C resent the segment in timeslot $T_6$ and RCST F resent the segment $T_9$. In other embodiments, there may be a delay of a number of timeslots from receipt of the SDBM until a collided segment may be resent.

In another embodiment the hub sends a BTP to a RCST. The BTP may identify timeslots within which the RCSTs may transmit information. The BTP may include information regarding the length of the timeslots, the frequency of the SDBM and information for synchronizing the timeslots. The BTP may also be sent at the beginning of every timeslot; after receipt of the BTP the RCST may then send a segment. The SDBM may include traffic load information, congestion control information, and/or transmission probability information.

A successful collision may occur when a segment is successfully received by the GCU despite a collision with another segment, because, for example, of a higher received power level. This situation may occur when a powerful forward error correction (FEC) code, such as a turbo code, is used in the system and a slight difference in $E_b/N_o$ makes a segment either successfully received or garbled. For example, during timeslot $T_2$ the GCU may successfully receive the segment sent from RCST F. The segment sent by RCST C was not successful during a successful collision. The GCU will communicate to the RCSTs that the segment from RCST C was not successful during timeslot $T_2$. When RCST C will resend the segment with the $F_{cotx}$ flag will be set in timeslot $T_6$.

Figure 5A:
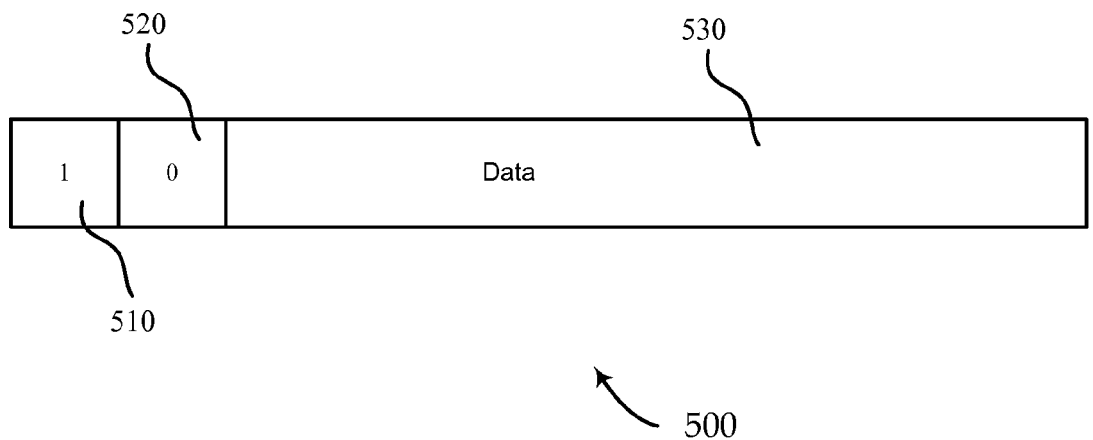
FIGS. 5A and 5B show data segment structure according to another embodiment of the invention.
Figure 5B:
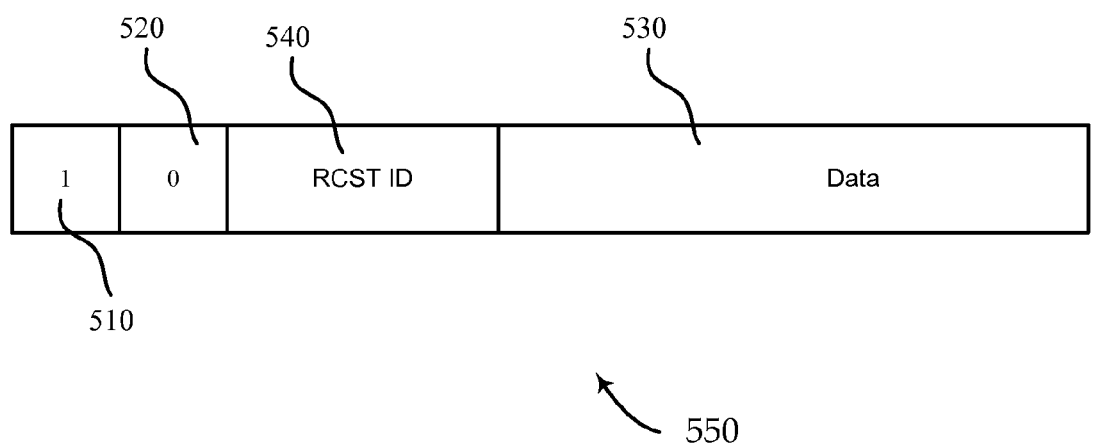

FIG. 5A shows a segment data structure 500 according to another embodiment of the invention A retransmission flag, $F_{retx}$, 510 may be set when the segment is being retransmitted because of a collision. A successful collision flag, $F_{cotx}$, 520 may also be set when a segment was not received during a successful collision. The data 530 follows the two flags. In another embodiment of the invention, RCST ID field 540 may also be included in the segment data structure 550 as shown in FIG. 5B. Data is sent in segments; packets may be received at the RCST and broken into segments prior to transmission. Segments may also be organized in frames.

Figure 6:
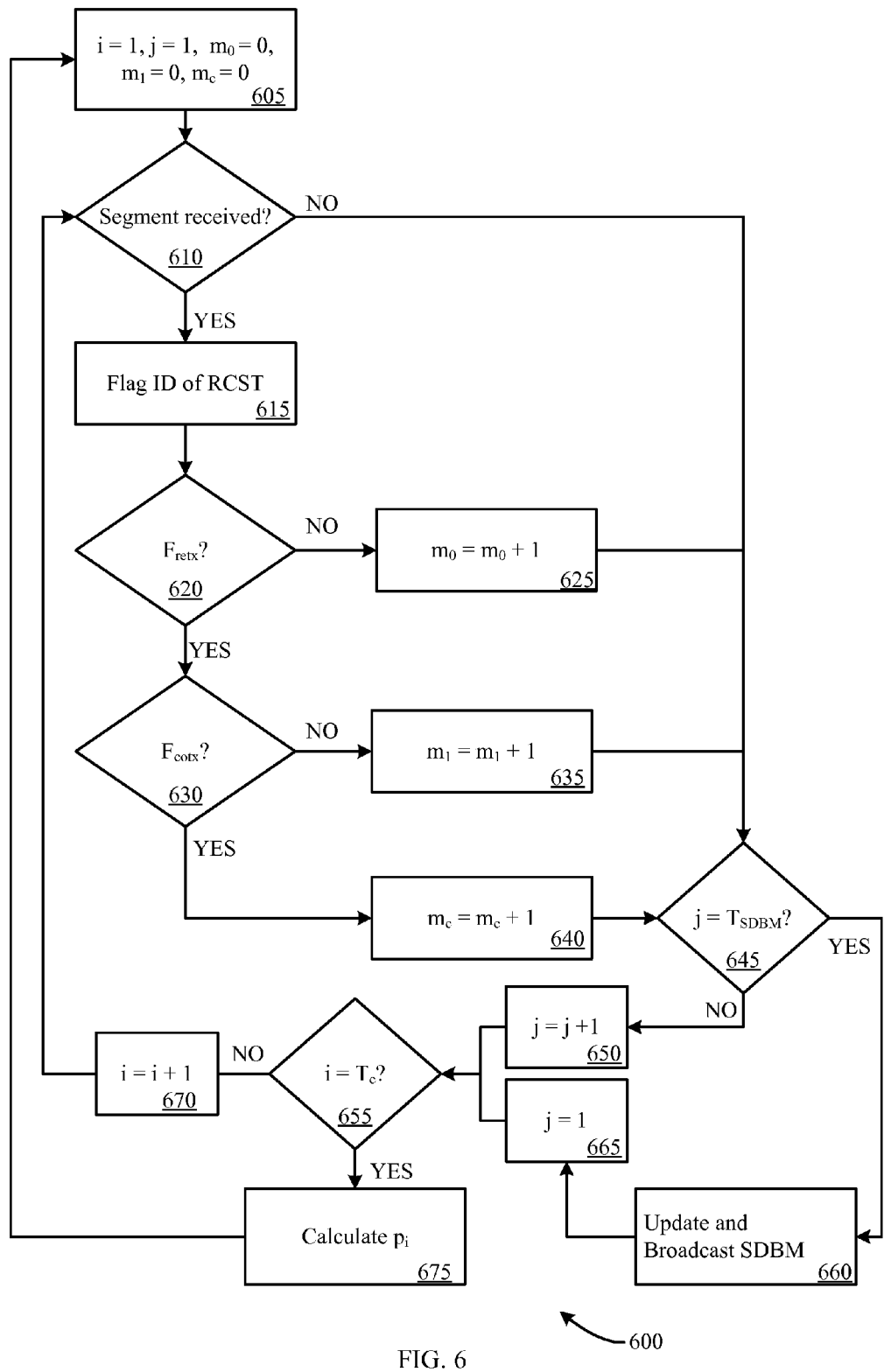
FIG. 6 shows a flow chart for determining the transmission probability at a hub based on segment transmission characteristics according to one embodiment of the invention.

FIG. 6 shows a flow chart 600 when segments are received at a hub according to another embodiment of the invention. At block 605 the system is initialized; the integers i and j are each set to 1 and each of the segment counters ($m_o$, $m_f$, $m_c$) are set to zero. The integer i counts the number of timeslots between resetting the segment counters ($T_c$). The integer j counts the number of timeslots between sending out an SDBM ($T_{SDBM}$). The method checks to see if a segment is received during a timeslot at block 610. If no segments were received, the method checks to see if the number of timeslots between SDBMs has occurred by checking to see if j=$T_{SDBM}$ at block 645. If not, j is incremented at block 650, otherwise an SDBM is updated and broadcast at block 660 and j is reset to equal 1 at block 665. The method then checks to see if the number of timeslots between resetting the segment counters and calculating $p_i$ has occurred by checking to see if i=$T_c$ at block 655. If so, $p_i$ is calculated at block 675 and the method resets at block 605. Otherwise, i is incremented at block 670 and the method returns to block 610 and checks for another segment.

If a segment was received at block 610, then the ID of the RCST that sent the segment is flagged at block 615. The timeslot in which the segment was received may also be flagged. If at block 620 the segment received at the hub is a first transmission ($F_{retx}$=0), then $m_o$ is incremented at block 625. If the received segment is not received during a first transmission ($F_{retx}$=1), then the segment is a retransmission. If the $F_{cotx}$ flag is set at block 630 then $m_c$ is incremented at block 640, otherwise $m_l$ is incremented at block 635. The $F_{cotx}$ flag indicates that the retransmission is the result of a collision with a successful segment from another RCST. After the segment counters are incremented 625, 635, 640, the method returns to block 645 and flows as described above.

In one embodiment of the invention the transmission probability, $p_i$, is a function of the transmission counter ($m_o$), retransmission counter ($m_l$), and successful retransmission counter ($m_c$) calculated over a set number of timeslots $T_c$, for example, 10 timeslots, 20 timeslots, 40 timeslots, 50 timeslots, 60 timeslots, etc. In one embodiment, $p_i$ is calculated from the following equation:

$$p_i = \text{Min}\left(\frac{G_0}{G_{est}} p_{i-1}, 1\right),$$

where the estimated traffic load $G_{est}$ may be calculated from $$G_{est} = \ln\left(1 + \frac{m_1 + m_c}{M_0}\right)$$

and $G_0$, the traffic load, may be found from solving:

$S_0 = G_0 e^{-G_0}$.

$S_0$ is the desired average throughput of the system and may be selected based on the desired throughput of the system. In one embodiment the actual throughput, S, is calculated from:

$$S = \frac{m_0 + m_1}{T_c}.$$

Other factors, such as such as average delay and/or off-axis emission requirements, may be taken into account in selecting a proper traffic load value and/or desired average throughput value. The above equations are shown as examples of determining the transmission probability from the transmission counter ($m_o$), retransmission counter ($m_l$), and successful retransmission counter ($m_c$).

In one embodiment of the invention, if the transmission counter equals zero ($m_o$=0) one of two situations has occurred: either no segments have been transmitted over the measured time period or there were collisions during every timeslot over the measured time period. The later case rarely occurs suddenly and the algorithms disclosed by embodiments of the invention should control transmission of segments such that this scenario does not occur. It may be assumed, therefore, that a transmission counter of zero ($m_o$=0) implies that no segments were transmitted. Therefore, the transmission probability equals 1 ($p_i$=1) when the transmission counter equals zero.

In another embodiment of the invention, if the retransmission counter equals zero ($m_l$=0) no retransmissions have occurred over the measured time period. In such a case the transmission probability equals 1 ($p_i$=1).

Figure 7:
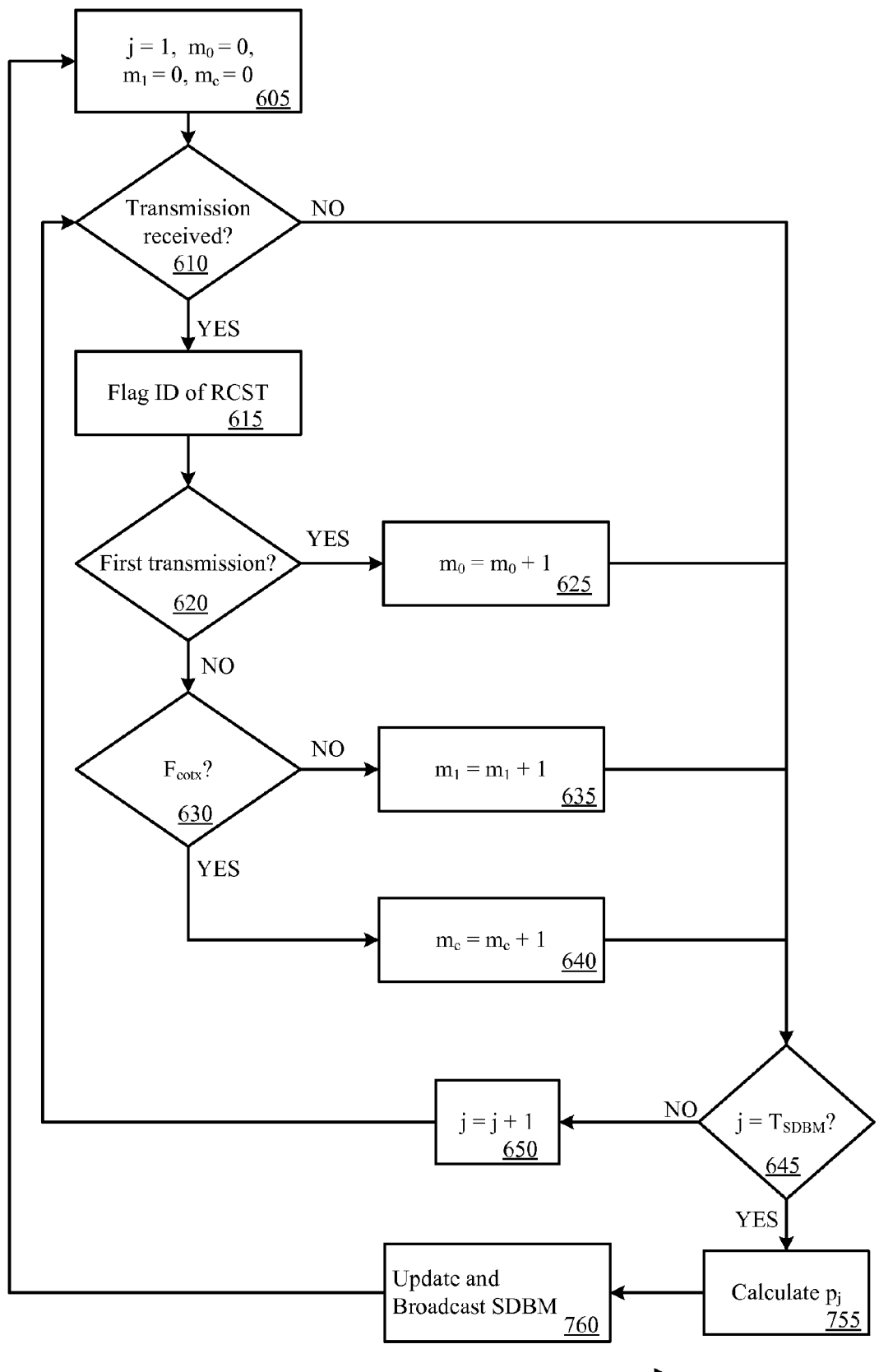
FIG. 7 also shows a flow chart for determining the transmission probability at a hub based on segment transmission characteristics and using a sliding scale according to one embodiment of the invention.

FIG. 7 also shows a flow chart for determining the transmission probability at a hub based on segment transmission characteristics and using a sliding scale according to one embodiment of the invention. Blocks 605, 610, 615, 620, 625, 630, 635, 640, 645, and 650 are the same as similarly numbered blocks in FIG. 6. In this case, the probability is constantly updated during every SDBM cycle at block 755 and broadcast to the RCSTs at block 760. The probability, for example may be calculated using a sliding scale.

Figure 8:
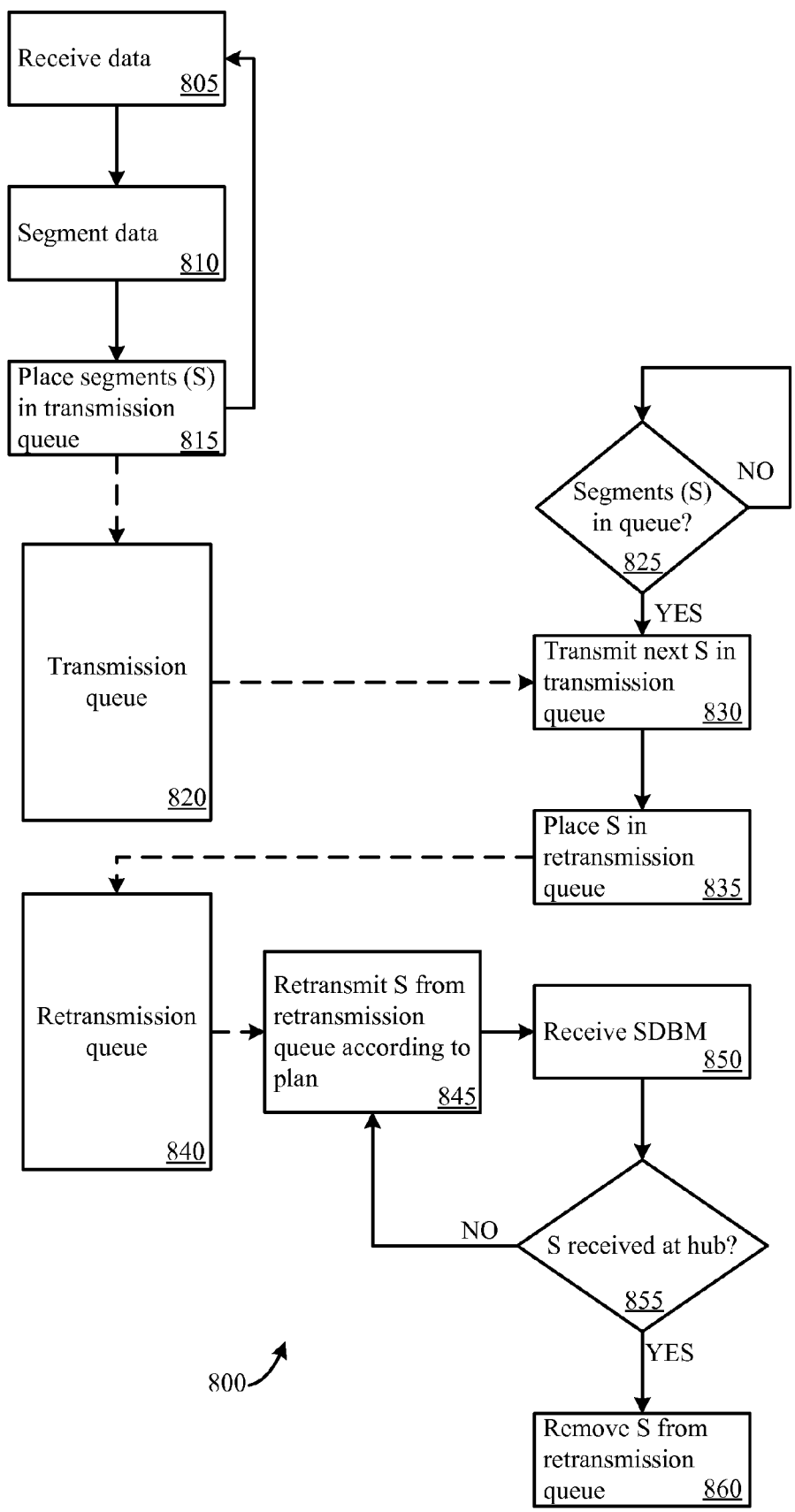
FIG. 8 shows a block diagram detailing how an RCST may use transmission and retransmission queues according to one embodiment of the invention.

FIG. 8 shows a block diagram detailing how an RCST may use transmission and retransmission queues according to one embodiment of the invention. Data is received at an RCST at block 805 and segmented at block 810. Whereupon, at block 815 the segments are placed in a transmission queue 820. Accordingly, received data is segmented and placed in the transmission queue independent of how packets are being transmitted.

Block 825 checks to see if there are segments in the transmission queue 820 for transmission. When a segment(s) is found in the queue, the next segment is transmitted to the hub at block 830. The segment may be transmitted during a timeslot, which may be selected using the transmission probability and binary probabilistic measure. Following transmission, at block 835, the segment is placed in the retransmission queue 840. The retransmission queue 840 and transmission queue 820 may be part of the same queue and/or storage structure. Pointers may be used to keep track of segments. An SDBM is received at block 850 and the system determines if the segment was receive at the hub at block 855. If the segment was received, the segment is removed from the retransmission queue at block 860 whereupon the method repeats. If the segment was not received at the hub at block 855, the segment is retransmitted at block 845 and the method returns to block 850. The retransmission time slot may be a function of the transmission probability.

Figure 9:
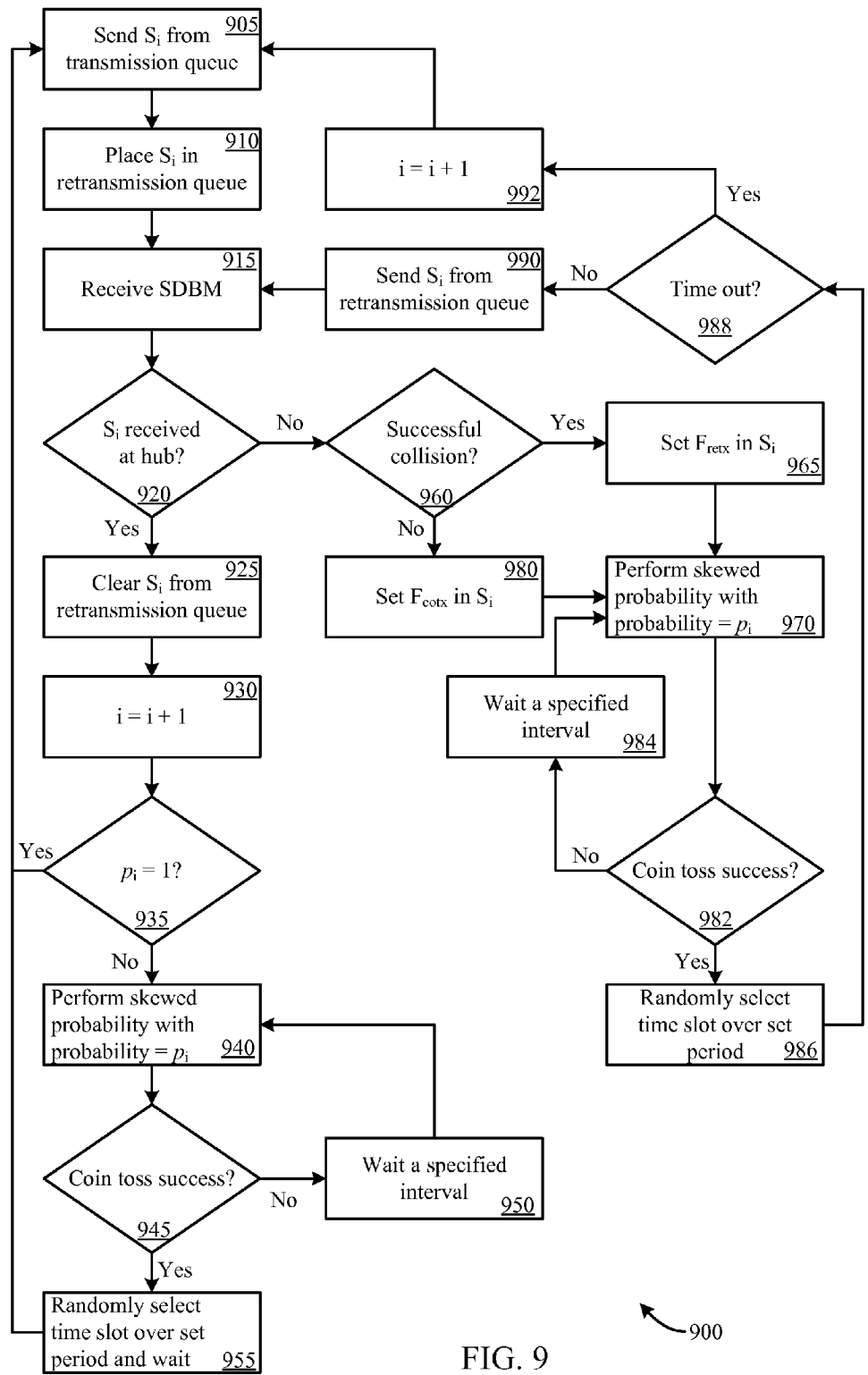
FIG. 9 shows a flowchart transmitting and retransmitting segments according to another embodiment of the invention.

FIG. 9 shows a flow chart 900 showing a process for implementing a transmission probability ($p_i$) received from a hub at the RCST according to one embodiment of the invention. The RCST sends a segment ($S_i$) from the transmission queue to the hub in a first timeslot 905 and saves the segment in a retransmission queue at block 910. At block 915, an SDBM is received from the hub at a later timeslot. The RCST may send other segments after sending the first segment and before receipt of the SDBM. The SDBM includes transmission probability information as well as received segment information. The SDBM may also contain information whether $S_1$ was received at the hab. If the SDBM indicates that $S_i$ was received, at block 920, then $S_i$ is cleared from the retransmission queue 925. The integer i is then incremented at block 930. The method may then determines when to send the segment based on $p_i$. If $p_i$=1 as determined in block 940 then the next segment is sent to the hub during the next timeslot at block 905. Otherwise, if $p_i$<1, then a skewed coin toss with probability of success equal to $p_i$ is performed at block 940. A random number generator may be used to perform the skewed coin toss. For example, a random number generator provided by an operating system may be used. If it is determined that the skewed coin toss was successful at block 945, then a timeslot is randomly selected over a first set period 955 and the segment is sent during that time period. The first set period may be a set SDBM cycle. The segment is therefore sent during some timeslot prior to the next SDBM. If the coin toss is not successful in block 945, then the system waits a second set period 965 and then performs the skewed coin toss again 950. The second set period may be an integer multiple of an SDBM cycle. In one embodiment, the second set period is 2 SDBM cycles.

Returning to block 920, if according to the SDBM $S_i$ was not received at the hub, $S_i$ will need to be retransmitted. The SDBM will communicate whether a segment was received and whether there was a successful collision. For example, the SDBM includes the timeslot a segment was received within the SDBM, if the RCST sent a segment during the specified timeslot, then the RCST then the segment was received. In other embodiments, the hub may identify the RCST that sent a segment in the SDBM. In yet other embodiments, a checksum may be included in the SDBM.

At block 960 the method determines whether a successful collision with a segment from another RCST is the cause of $S_i$ not being received at the RCST. If a successful collision was the cause, $F_{cotx}$ is flagged in $S_i$ at block 980, otherwise $F_{retx}$ is set at block 965. A skewed coin toss with probability of success equal to $p_i$ is performed at block 970. A random number generator may be used to perform the skewed coin toss. For example, a random number generator provided by an operating system may be used. If it is determined that the skewed coin toss was successful at block 982, then a timeslot is randomly selected over a first set period 986 and the segment is sent during that time period. The first set period may be a set SDBM cycle. The segment is therefore sent during some timeslot prior to the next SDBM. If the coin toss is not successful in block 982, then the system waits a second set period 984 and then performs the skewed coin toss again 970. The second set period may be an integer multiple of an SDBM cycle. In one embodiment, the second set period is 2 SDBM cycles. Prior to resending $S_i$ from the retransmission queue at block 990, the system checks to see if the time out threshold has been reached. The time out threshold may be up to 10 seconds from the time segment $S_i$ was first sent. If time the timeout threshold as not met, then $S_i$ is transmitted from the retransmission queue at block 990, otherwise i is incremented at block 992 and the next segment is transmitted at block 905.

Figure 10:
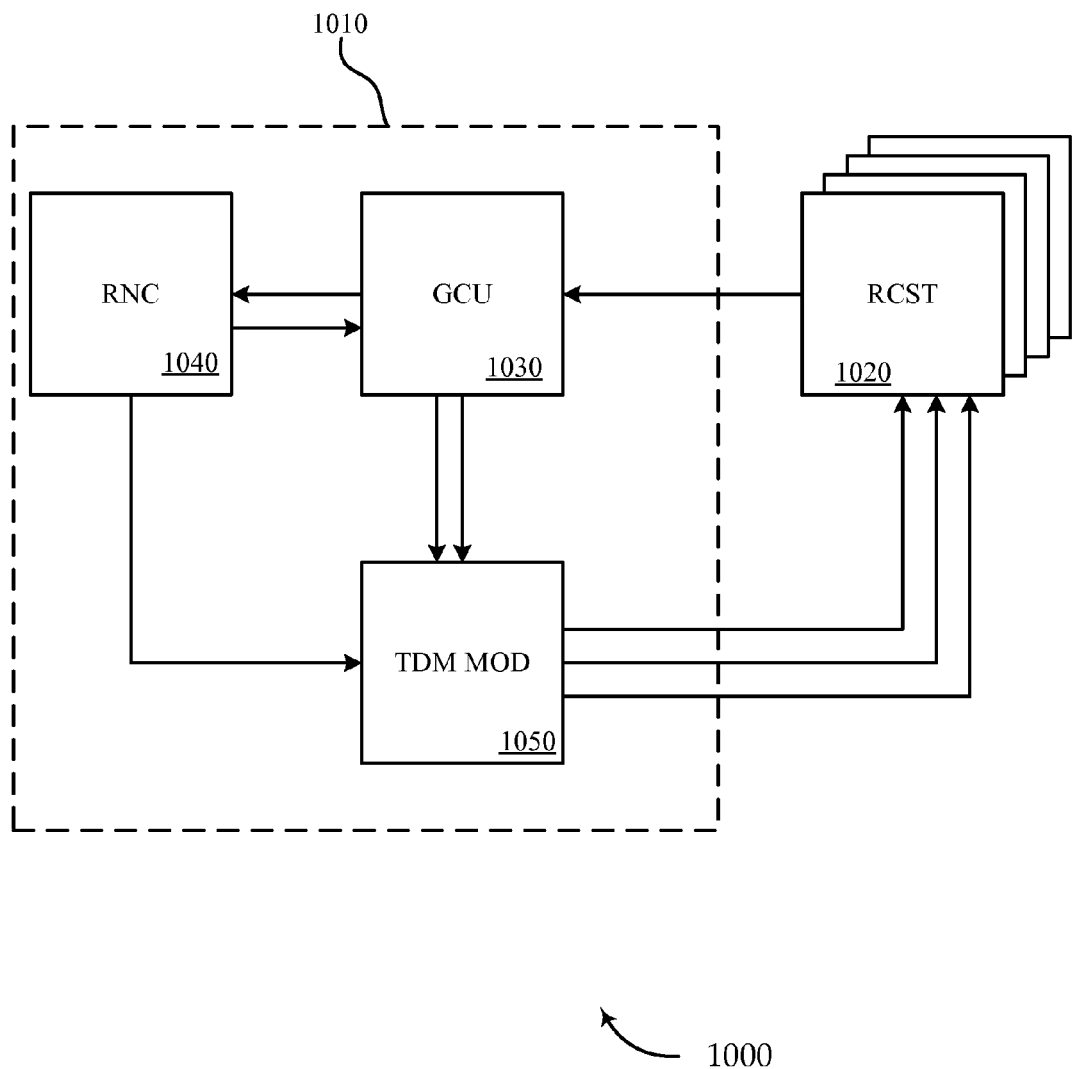
FIG. 10 shows a block diagram of a hub and a return channel satellite terminals (RCST) according to one embodiment of the invention.

FIG. 10 shows a system block diagram 1000 according to one embodiment of the invention. The block diagram 1000 shows a hub 1010 in communication with a RCST 1020. More than one RCST 1020 and/or hub 1010 may be included. Also the hub 1010 and RCST 1020 may communicate through a satellite and/or a terrestrial repeater. The hub includes a regional network controller (RNC) 1040, a GCU and a TDM modulator 1050. The GCU receives segments from the RCST 1020, calculates the transmission probability, loading and other communications factors. The GCU 1030 may also prepare the SDBM. The GCU communicates the transmission probability and the SDBM to the TDM modulator 1050. The TDM module then prepares to send the SDBM and other data to the RCST in the proper format and with the proper timing.

The RNC 1040 prepares the BTP and transmits it to the TDM modulator 1050 and the GCU 1020. The RNC 1040 may also establish a network between the RCSTs, log in new RCSTs, and perform other network management operations. The RNC may adjust the BTP a set number of frames. For example, the BTP may change every 30 frames according to the load on the system. In another embodiment, the BTP may depend on the load as detected at the network layer.

Figure 11:
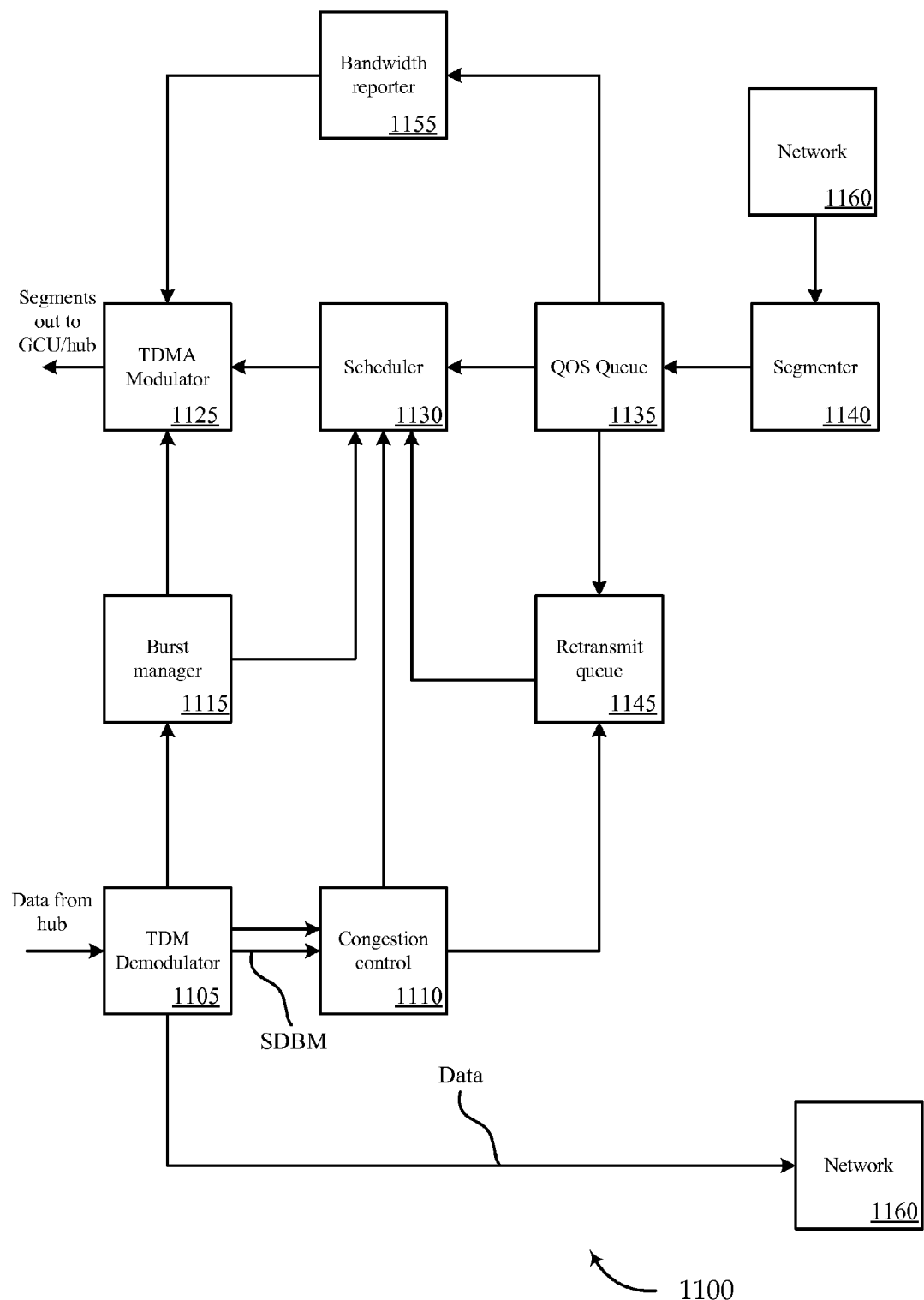
FIG. 11 shows a block diagram of components within a RCST according to one embodiment of the invention.

FIG. 11 shows a block diagram 1100 of portions of a RCST according to one embodiment of the invention. The TDM demodulator module 1105 receives data from the hub. Received data may include a BTP, SDBM, transmission probabilities, segment counters, as well as data for the subscriber associated with the RCST. The TDM demodulator may be coupled with an antenna. The communications link between the hub and the RCST may be continuous. The TDM demodulator 1105 parses the data received from the hub and sends the parsed data to the appropriate module. BTP data is sent to the burst manager 1115. SDBM and transmission probability data is sent to the congestion control module 1110.

The burst manager 1115 receives BTPs from the TDM demodulator. The burst time plan ensures the timing of transmission timeslots and is coordinated among all the RCSTs in the system as well as the GCU. The BTP controls the length of the timeslots and coordinates delays in signals based on the distance the RCST is from the hub and/or satellite. The burst manager coordinates timing of other modules in the system, such as the TDMA modulator 1125 and the scheduler 1130. For example, the burst manager 1115 tells the scheduler 1130 the available timeslots and any timing offsets.

The congestion control module 1110 receives transmission probability data $p_i$ and SDBMs from the TDM demodulator 1105. When a data segment is received at the hub, the RCST that sent the segment is notified via the SDBM. The congestion control module 1110 instructs the retransmission queue 1145 to purge segments that were received by the hub as reported by the SDBM. The congestion control module 1130 also instructs the scheduler regarding the transmission probability $p_i$ indicating when to retransmit segments that were not received at the hub.

A data stream is received from the network 1160 at the segmenter 1140. The data stream, for example, may be continuous or a series of packets. Regardless of the type of data stream the segmenter 1140 segments the data into appropriately sized segments and includes any administrative data such as, for example, headers, footers, checksums, RCST IDs etc. The segmenter 1140 places the segments in the quality of service (QOS) queue 1135.

The QOS queue 1140 holds and organizes the segments prior to transmission. The QOS queue 1140 may organize segments according to their priority. When a segment is sent to the scheduler 1130 a copy is also sent to the retransmission queue 1145. The retransmission queue 1145 and the QOS queue 1140 may be part of the same physical buffer. For example, the transmitted segment may be saved in a higher order QOS queue until the RCST is notified that the segment has been received.

The scheduler 1130 pulls segments from the retransmission queue 1145 or the QOS queue 1135 and sends them to the TDMA modulator 1125 for transmission to the hub in an available timeslot. The scheduler may determine the timeslot and frame in which a segment may be transmitted. The scheduler 1130 may also set retransmission and successful collision flags in a segment. If there are no retransmission segments in the retransmission queue 1145, then the scheduler pulls segments from the QOS queue 1135. If there are segments in the retransmission queue 1145, but an SDBM has not been received from the RCST for the time period in which the segment was sent, then the scheduler pulls segments from the QOS queue 1135. If however, the SDBM indicates that segments were not received at the hub, then the scheduler 1130 will pull segments from the retransmission queue 1145. The segments pulled from either the QOS queue 1135 or the retransmission queue 1145 will be sent during a later timeslot based on the transmission probability $p_t$. The segments may be sent to the hub in a timeslot as determined by the process shown in FIG. 7.

The TDMA modulator 925 sends segments to the hub from the scheduler according to the BTP as dictated by the burst manager and in the timeslot dictated by the scheduler 930. The TDM modulator 925 may be coupled with an antenna for transmission.

The bandwidth reporter 955 prepares and/or calculates the bandwidth needed to transmit the segments in the QOS queue 935. The bandwidth reporter may request dedicated timeslots from the RNC.

In other embodiments a satellite may monitor $m_o$, $m_I$, and $m_c$, calculate the transmission probability and send out the SDBM. In other embodiments, the RCSTs may calculate the transmission probability. The values, $m_o$, $m_I$, and $m_c$, may be communicated to the RCSTs from the satellite or GCU. In other embodiments the RCST may monitor $m_o$, $m_I$, and $m_c$ as sent by all of the RCSTs in the network and calculate transmission probability.

A number of variations and modifications of the disclosed embodiments can also be used. For example, the embodiments may operate in any communications network. Specifically, the embodiments may be used in satellite communications network with a plurality of subscriber terminals operating as the RCSTs. For example, the systems and methods may operate in a very small aperture terminal satellite (VSAT) network operating in a star or mesh topology.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, and/or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for providing congestion control in a slotted Aloha communication system that includes a hub in communication with one or more RCST, the method occurring at the hub comprising:
   receiving segments from one or more RCST, wherein each segment is received from an RCST at the hub during a timeslot, and for each received segment:
   incrementing a transmission counter;
   determining whether the segment is a retransmission segment, if so, incrementing a retransmission counter; and
   determining whether the segment is an unsuccessful collision retransmission segment, if so, incrementing a successful retransmission counter; and
   transmitting a message to each RCST after a first time interval, wherein the message includes the transmission counter, the retransmission counter, and the successful retransmission counter.

2. The method according to claim 1, wherein said determining whether the segment is a retransmission segment comprises determining whether a retransmission flag in the segment is asserted.

3. The method according to claim 1, wherein said determining whether the segment is an unsuccessful collision retransmission segment comprises determining whether a successful retransmission flag in the segment is asserted.

4. The method according to claim 1, wherein the message transmitted to each RCST also includes information correlating segments received during the first time period with the transmitting RCST and the timeslot in which the segment was received.

5. The method according to claim 1, further comprising resetting each of the transmission counter, the retransmission counter, and the successful retransmission counter after a second time interval.

6. A method for providing congestion control in a slotted Aloha communication system that includes a hub in communication with one or more RCST, the method occurring at the hub comprising:
   receiving segments from one or more RCST, wherein each segment is received during a timeslot and for each received segment determining which RCST sent the segment;
   creating a segment detection bitmap, wherein the segment detection bitmap includes information correlating received segments with the RCST that transmitted the segments and the timeslot in which the segment was received, wherein the segment detection bitmap further comprises information including the number segments received during the segment detection period, the number of retransmission segments received during the segment detection period, and the number of successful collision retransmission segments received during the segment detection period; and
   transmitting the segment detection bitmap to each RCST after a segment detection period.

7. A method for providing congestion control in a slotted Aloha communication system that includes a hub in communication more than one RCST, the method occurring at an RCST comprising:
   transmitting a first segment to the hub during a first timeslot;
   receiving a segment detection bitmap from the hub, wherein the segment detection bitmap is received after the first segment is transmitted to the hub;
   determining from the segment detection bitmap whether the first segment was received at the hub, and asserting the retransmission flag in the first segment if the first segment was not received at the hub;
   determining from the segment detection bitmap whether the first segment was not received at the hub due to a collision with another segment from another RCST that was successfully received, and asserting the successful collision flag in the first segment if the segment was not received due to a successful collision; and
   retransmitting the first segment if either or both of the retransmission flag is asserted or the successful collision flag is asserted.

8. The method according to claim 7, further comprising placing the first segment in a retransmission queue after transmitting the first segment to the hub.

9. The method according to claim 8, further comprising removing the first segment from the retransmission queue if the first segment was received at the hub according to the segment detection bitmap.

10. The method according to claim 7, wherein the segment detection bitmap comprises information that identifies RCSTs that transmitted a received segment during a specific timeslot.

11. The method according to claim 7, further comprising transmitting the next segment if the first segment was received at the hub.

12. The method according to claim 8, further comprising:
   calculating a transmission probability based on information communicated to the RCST in the segment detection bitmap;
   performing a binary probabilistic measure with the probability of success equal to the transmission probability; and
   determining a timeslot to transmit the next segment or to retransmit the first segment based on the result of the binary probabilistic measure.

13. The method according to claim 12, wherein the binary probabilistic measure includes a skewed coin toss.

14. A method for providing congestion control in a slotted Aloha communication system that includes a hub in communication more than one RCST, the method occurring at an RCST comprising:
   receiving a segment detection bitmap, wherein the segment detection bitmap includes a transmission counter, a retransmission counter and a successful retransmission counter;
   determining a transmission probability, wherein the transmission probability depends on the transmission counter, the retransmission counter and the successful retransmission counter; and
   performing a binary probabilistic measure with the probability of success equal to the transmission probability, wherein if the binary probabilistic measure is successful then a timeslot is selected within a number of timeslots for transmitting a segment, otherwise, if the binary probabilistic measure is unsuccessful then waiting a number of timeslots to re-perform the binary probabilistic measure.

15. The method according to claim 14, wherein the transmission probability is determined from the following equation:

$$p_i = \text{Min}\left(\frac{G_0}{G_{est}} p_{i-1}, 1\right),$$

where $G_{est}$ is the estimated traffic and $G_0$ is the traffic load.

16. The method according to claim 14, wherein the binary probabilistic measure comprises a skewed coin toss.

* * * * *

UNITED STATES PATENT AND TRADEMARK OFFICE
CERTIFICATE OF CORRECTION

| | | |
|---|---|---|
| PATENT NO. | : 7,773,576 B2 | Page 1 of 1 |
| APPLICATION NO. | : 12/037760 | |
| DATED | : August 10, 2010 | |
| INVENTOR(S) | : Inukai et al. | |

It is certified that error appears in the above-identified patent and that said Letters Patent is hereby corrected as shown below:

Claim 12, Column 14, Line 12, please delete "8" and insert -- 7 --

Signed and Sealed this

Fifth Day of October, 2010

David J. Kappos
*Director of the United States Patent and Trademark Office*